United States Patent
Irwin

(10) Patent No.: US 7,396,474 B2
(45) Date of Patent: Jul. 8, 2008

(54) DUAL INJECTION OF TWO POLYMERIC FILTRATION AIDS FOR GYPSUM REMOVAL FROM PHOSPHORIC ACID/GYPSUM SLURRY

(75) Inventor: Louis Irwin, Winter Haven, FL (US)

(73) Assignee: Arr-Maz Products, LP, Mulberry, FL (US)

( * ) Notice: Subject to any disclaimer, the term of this patent is extended or adjusted under 35 U.S.C. 154(b) by 295 days.

(21) Appl. No.: 11/269,357

(22) Filed: Nov. 8, 2005

(65) Prior Publication Data
US 2007/0102368 A1    May 10, 2007

(51) Int. Cl.
B01D 37/03    (2006.01)

(52) U.S. Cl. .................... 210/778; 210/727; 210/734; 423/321.1

(58) Field of Classification Search .................. 210/778
See application file for complete search history.

(56) References Cited

U.S. PATENT DOCUMENTS

| | | | |
|---|---|---|---|
| 3,192,014 A | 6/1965 | Leyshon et al. | |
| 3,617,568 A * | 11/1971 | Ries, Jr. ..................... | 210/727 |
| 3,644,091 A | 2/1972 | Naschke et al. | |
| 4,220,630 A | 9/1980 | Ore' | |
| 4,277,448 A | 7/1981 | Ore et al. | |
| 4,291,005 A | 9/1981 | Poulos et al. | |
| 4,305,915 A * | 12/1981 | Hill .......................... | 423/321.1 |
| 4,332,779 A * | 6/1982 | Thibodeau et al. ........ | 423/321.2 |
| 4,354,943 A * | 10/1982 | Dobry ........................ | 210/727 |
| 4,569,768 A * | 2/1986 | McKinley .................... | 210/727 |
| 4,800,071 A | 1/1989 | Kaesler et al. | |
| 5,009,873 A | 4/1991 | Kerr et al. | |
| 5,173,280 A | 12/1992 | Rey et al. | |
| 5,185,135 A | 2/1993 | Pillai et al. | |
| 5,211,928 A | 5/1993 | Rey et al. | |
| 2005/0098495 A1 | 5/2005 | Hughes | |

* cited by examiner

Primary Examiner—Peter A. Hruskoci
(74) Attorney, Agent, or Firm—Dennis G. LaPointe

(57) ABSTRACT

A process to improve the polymeric filtration aid performance used in removal of gypsum from phosphoric acid/gypsum slurry. A synergistic effect has been observed by using a Dual Injection method. This method more specifically involves using two polymers (A & B) of different chemistry and injecting into slurry at a different time. The polymer chemistry of filtration aid A is selected from the group consisting of nonionic, anionic, and cationic polymers and the polymer chemistry of filtration aid B is selected from the group consisting of sulfonated polymers. The polymer (A & B) usage is reduced by around 50% and performance improved.

5 Claims, 6 Drawing Sheets

DUAL INJECTION OF TWO POLYMERIC FILTRATION AIDS FOR GYPSUM REMOVAL FROM PHOSPHORIC ACID/GYPSUM SLURRY

BACKGROUND OF THE INVENTION

1. Field of the Invention

The present invention relates, generally, to filtration aids. A process has been developed to improve polymeric filtration aid performance in the removal of gypsum from phosphoric acid/gypsum slurry.

2. Description of the Related Art

During the process of producing phosphoric acid (for fertilizer), gypsum is formed as a by-product in the 25-45% phosphoric acid solution. This gypsum is filtered out with various types of vacuum filters. Polymeric filtration aids have been used to enhance filtration time for faster production and higher recovery of the phosphoric acid.

The polymeric filtration aids are high molecular weight polymers, of various chemistries and molecular weights specific for various phosphate ores. The chemical class of the polymers that have been used is classified as non-ionic, anionic or cationic in nature.

The normal application of the polymers is by making a 0.5-3% polymer solution and injecting this into the gypsum/phosphoric acid slurry prior to filtration (by vacuum filter). The amount of polymer filtration aid for maximum performance varies with each production facility and ranges from 5-150 ppm (via volume of slurry). The amount of performance improvement by the filtration aid varies typically from 5-70%.

SUMMARY OF THE INVENTION

The present invention is both a chemical and physical process to improve the polymeric filtration aid performance used in removal of gypsum from phosphoric acid/gypsum slurry. A synergistic effect has been observed by using a dual injection method (physical process); specifically when using two polymers of different chemistry (chemical process) and injecting into the slurry at a different time, the polymer usage is reduced by around 50% and performance improved.

DETAILED DESCRIPTION OF THE INVENTION

Various anionic, non-ionic, cationic and sulfonated polymers have been used as filtration aids for gypsum from phosphoric acid. Each ore and its phosphoric acid slurry are specific to which polymer performs best and determines what polymer dosage is required. When western (Idaho and Wyoming) phosphate ore are used for the phosphoric acid/gypsum slurry, the polymeric filtration aid can improve performance by up to 70%; however the filtration aid usage can be as high as 150 ppm (via volume of slurry).

A synergistic effect has been observed by using a dual injection method. More specifically, when using two polymers of different chemistry (A & B) and injecting into the slurry at a different time, the Polymer usage is reduced by around 50% and performance improved.

The polymer chemistry of filtration aid "A" could be non-ionic, anionic, or cationic depending on the phosphate ore used to make the phosphoric acid. The polymer chemistry of filtration aid "B" should be a sulfonated polymer. The best results observed for western ore have been non-ionic "A"+ sulfonated "B" filtration aid. Results could vary depending on the ore type.

Furthermore, to achieve the lowest usage, a combination of sulfonated+non-ionic polymer in a specific ratio is required. The type of sulfonated polymer or type of non-ionic polymer is not as critical as the A & B proportions, or more importantly the dual injection. This process works best via a separate polymer injection with a minimum of 5 seconds between the two polymers, whereas simultaneous injection or premixing of polymer solutions (A & B) is not as effective. It is preferred that the intervals between the injections be about 5 to 15 seconds. Best results have been achieved when using the sulfonated "B" polymer first.

EXAMPLES

The following examples serve to provide further appreciation of the invention and are not meant in any way to restrict the effective scope of the invention.

Example #1

Single Versus Dual Injection Polymer Performance

Figure 1A:
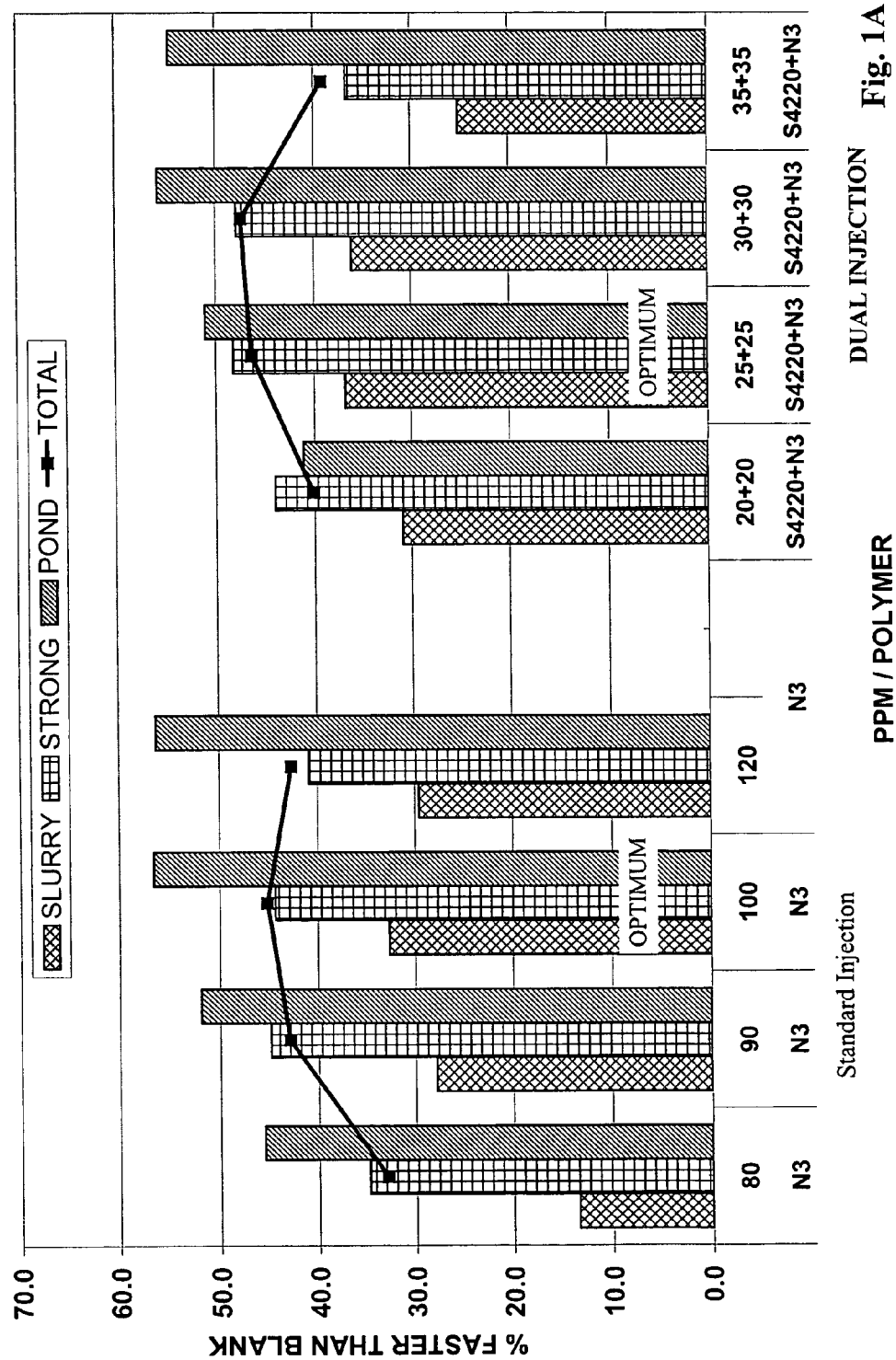
FIG. 1A is a chart depicting an example of a single versus dual injection polymer performance.

FIG. 1A shows a chart of the percent of filtration rate improvement with filtration aid. This test data indicates the standard type polymeric filtration aid N-3, single injection and single polymer, requires a 100-ppm dosage for maximum performance. However, a dual injection with two polymers, S4220+N-3 requires only 25 PPM each (or 50 PPM total) to obtain the maximum performance. The performance for the slurry filtration section is also better for increased production rate.

Polymer S4220 is a high molecular weight Sulfonated polymer, produced from the two monomers ATBS (Acrylamide Tertialy-Butyl Sulfonic acid) and Acrylic Acid. Polymer N-3 is a low molecular weight Non-ionic Polymer, produced from the monomer Acrylamide.

Figure 1B:
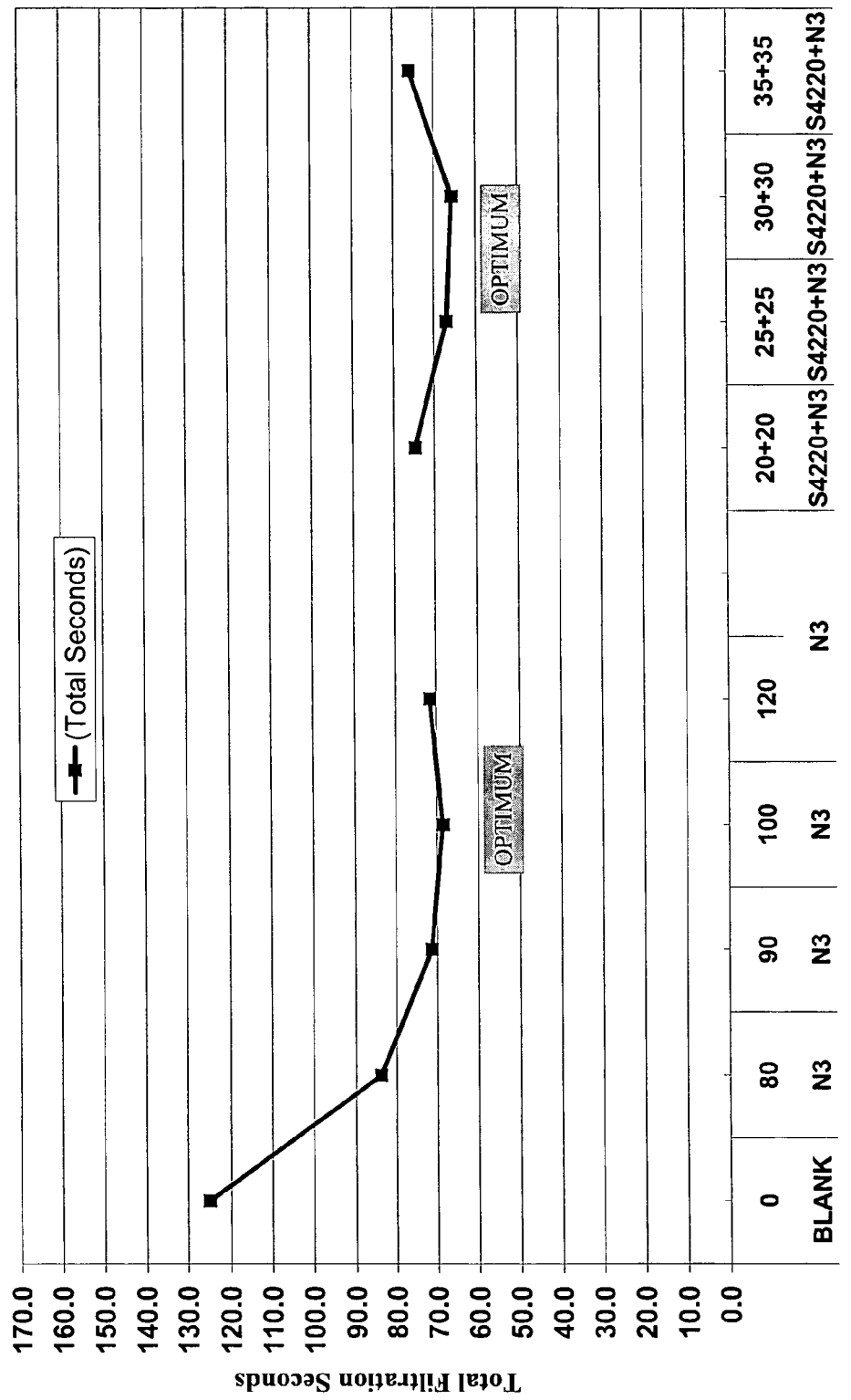
FIG. 1B is a chart depicting an example of the actual filtration rate in seconds using a filtration aid as in FIG. 1A.

FIG. 1B is a chart that shows an example of the actual filtration rate in seconds using a filtration aid. This test data indicates the standard type polymeric filtration aid N-3, single injection and single polymer, requires 100 ppm dosage for a minimum filtration time of 70 seconds. However, a dual injection with two polymers, S4220+N-3 requires only 25 ppm each (or 50 ppm total) to obtain a lower minimum filtration time of 68 seconds.

Example #2

Dual Injection Method—Single Versus Two Polymers

Figure 2:
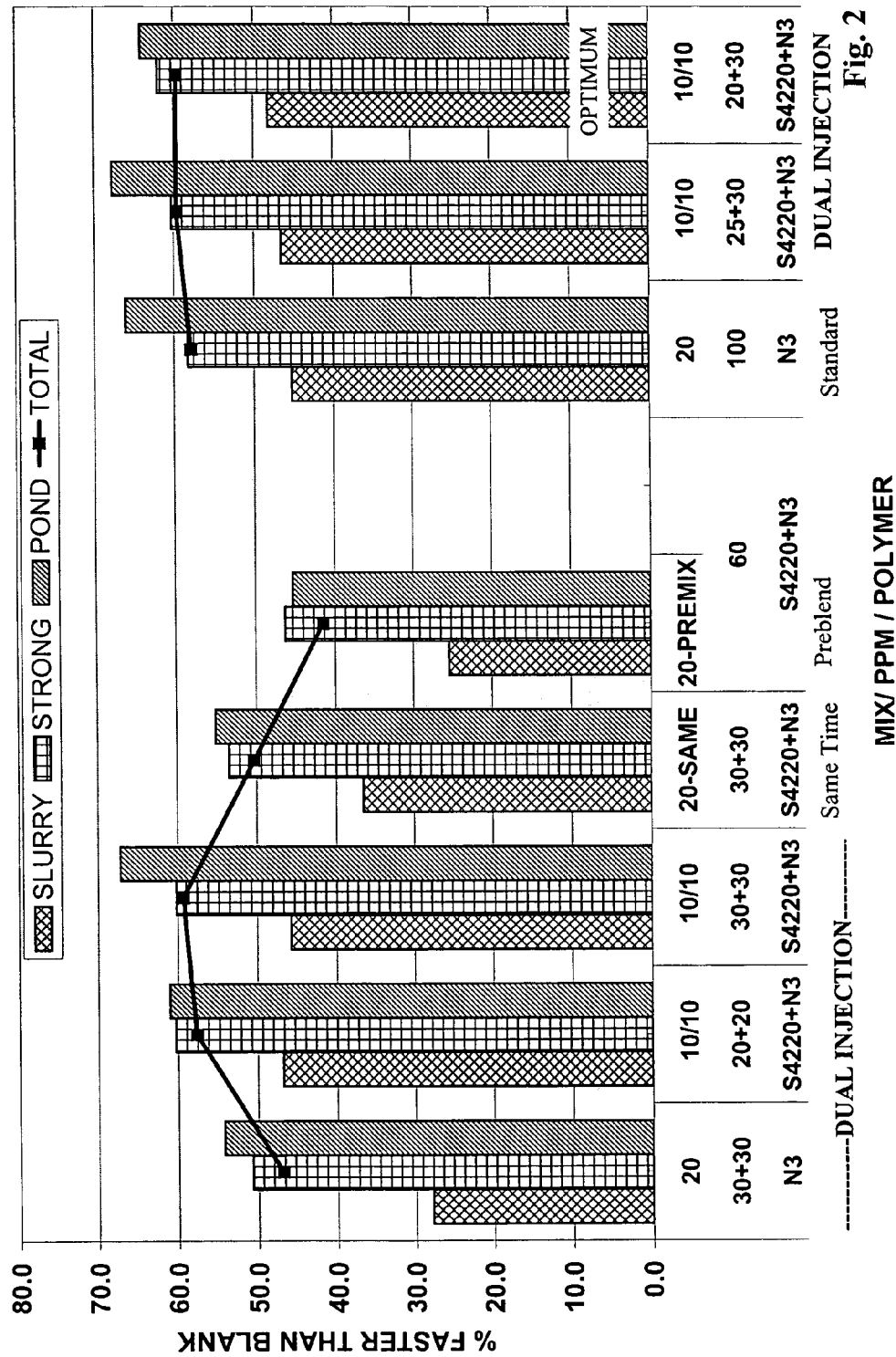
FIG. 2 is a chart, which shows the percent of filtration rate improvement with filtration aid where the test data indicates the standard type polymeric filtration aid N-3 as a dual injection is inferior to the two-polymer system with dual injection and the two polymers, S4220+N-3, performs best when injected separately versus at same time or as a preblended solution.

FIG. 2 shows the percent of filtration rate improvement with filtration aid where the test data indicates the standard type polymeric filtration aid N-3 as a dual injection is inferior to the two-polymer system with dual injection. The two Polymers, S4220+N-3, perform best when injected separately versus at same time or as a preblended solution. The dual injection/dual polymer system continues to show 50% lower dosage.

Example #3

Dual Injection Method—Mix Time

Figure 3:
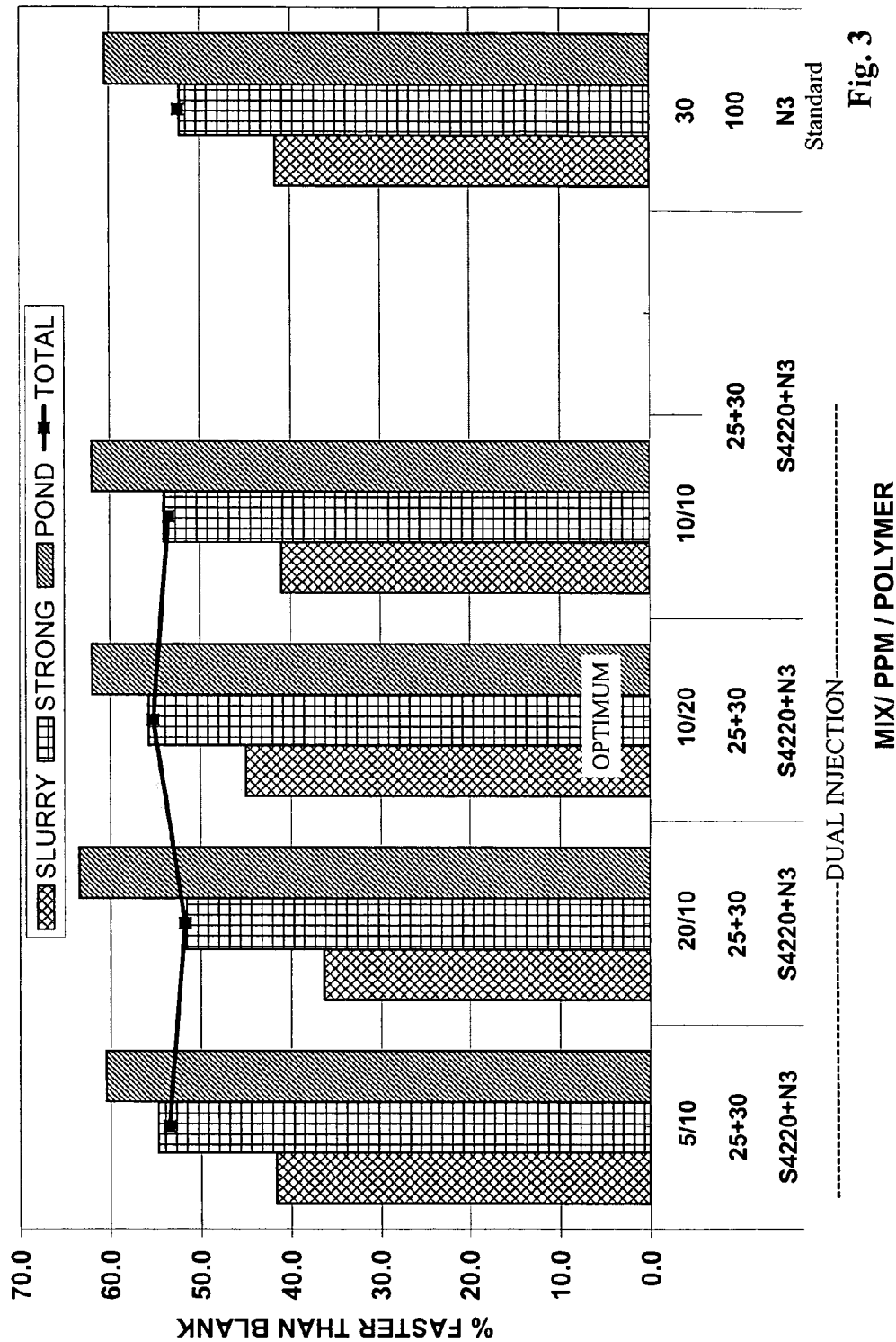
FIG. 3 is a chart, which shows the percent of filtration rate improvement with filtration aid where the test data indicates the mix time of the two polymers for the dual injection is important for maximum performance.

FIG. 3 shows the percent of filtration rate improvement with filtration aid where the test data indicates the mix time of the two polymers for the dual injection is important for maximum performance.

Example #4

Dual Injection Method—Various Sulfonated Polymers

Figure 4:
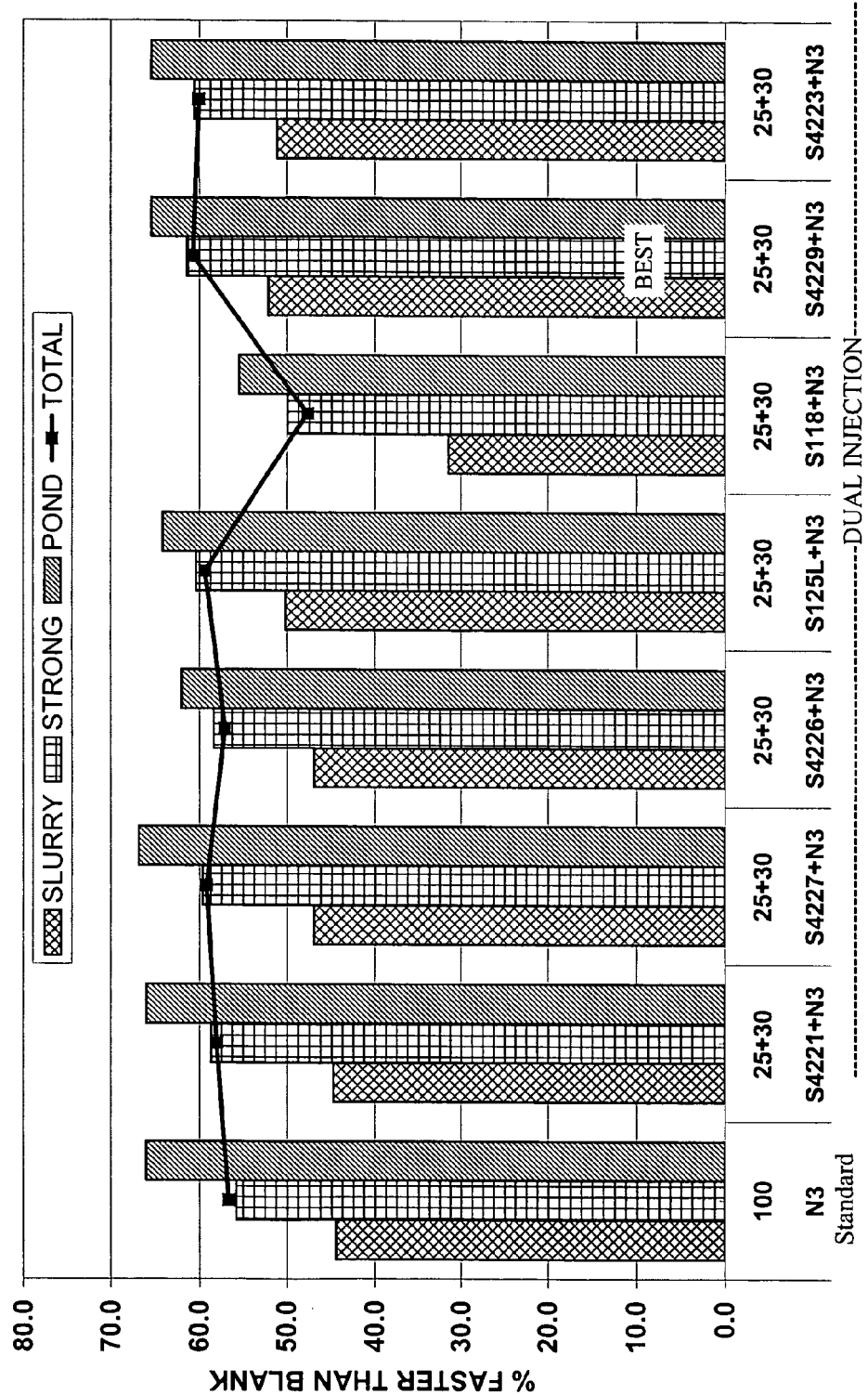
FIG. 4 is a chart, which shows the percent of filtration rate improvement with filtration aid where the test data indicates that a variety of sulfonated polymers (plus N-3 Non-ionic) perform well for the dual injection, with most showing low dosage and better performance than single Polymer N-3.

FIG. 4 shows the percent of filtration rate improvement with filtration aid where the test data indicates that a variety of sulfonated polymers (plus N-3 Non-ionic) perform well for the dual injection, with most showing low dosage and better performance than single Polymer N-3.

Example #5

Dual Injection Method—Various Sulfonated Polymers

Figure 5:
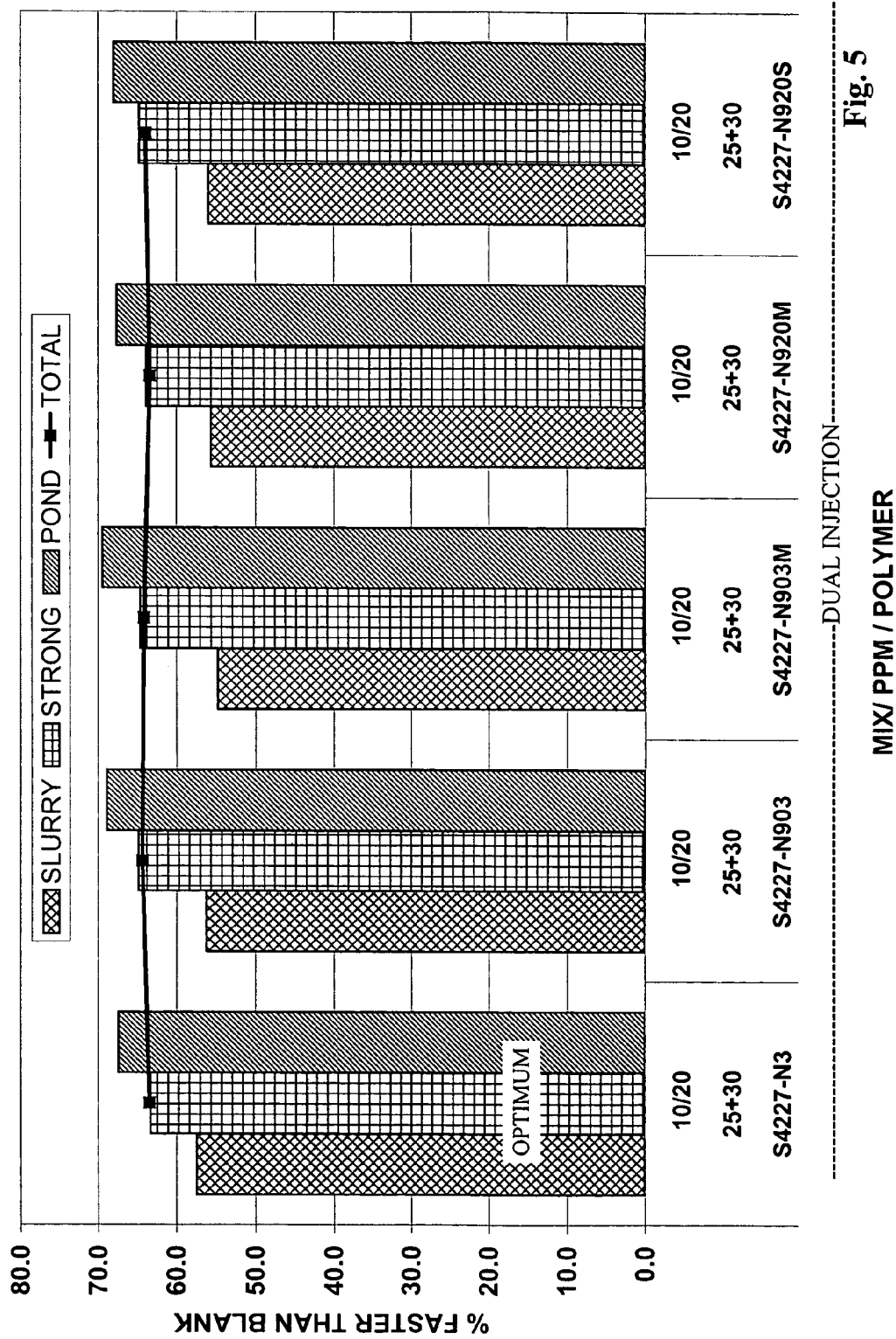
FIG. 5 is a chart, which shows the percent of filtration rate improvement with filtration aid where the test data indicates that a variety of non-ionic polymers (plus Sulfonated S4227) perform well for the dual injection, showing polymer type not as important as dual injection.

FIG. 5 shows the percent of filtration rate improvement with filtration aid where the test data indicates that a variety of non-ionic polymers (plus Sulfonated S4227) perform well for the dual injection, showing polymer type not as important as dual injection. Polymer S4227 is a low molecular weight Sulfonated polymer, produced from the two monomers ATBS (Acrylamide Tertialy-Butyl Sulfonic acid) and Acrylamide.

For additional explanation of the polymers noted on the drawings, polymer S4220, S4221, S4223 are sulfonated co-polymers, produced from the two monomers; ATBS (Acrylamide Tertialy-Butyl Sulfonic acid) and Acrylic Acid of various ratios and polymerized in various molecular weights.

Polymers S4227, S4226, S4229, S118, S125L are sulfonated co-polymers, produced from the two monomers; ATBS (Acrylamide Tertialy-Butyl Sulfonic Acid) and Acrylamide of various ratios and polymerized in various molecular weights.

Polymers N-3, N920M, and N920S are non-ionic polymers, produced from the monomer acrylamide and polymerized in various molecular weights.

Polymers N-903, N903M are non-ionic/anionic co-polymers, produced from the monomers acrylamide and acrylic acid of various ratios and polymerized in various molecular weights

What is claimed is:

1. A polymeric filtration aid method for gypsum removal from phosphoric acid/gypsum slurry, the method comprising:
a dual injection process where two different polymers are separately injected into a phosphoric acid/gypsum slurry at a different time, followed by filtration of gypsum solids from a liquid phosphoric acid,
wherein said phosphoric acid/gypsum slurry is produced from western phosphate ore obtained from mines in Idaho, and wherein the two different polymers are respectively comprised of different polymer chemistries of filtration aid A and B respectively, the polymer chemistry of filtration aid A being selected from the group consisting of non-ionic and anionic polymers produced from acrylamide and acrylic acid monomers, and the polymer chemistry of filtration aid B being selected from the group consisting of sulfonated polymers, wherein the sulfonated polymers comprise acrylamide tertialy-butyl (ATBS) and acrylamide or acrylic acid copolymers.

2. The method according to claim 1, wherein polymer usage is reduced by about 50 percent from a single injection of a single polymer.

3. The method according to claim 1, wherein the sulfonated polymer B is injected first and the polymer chemistry of filtration aid A is subsequently injected.

4. The method according to claim 3, wherein a time interval between the injection of the polymer chemistry of filtration aids A and B is about 5-15 seconds.

5. The method according to claim 3, wherein the sulfonated polymer B comprises an acrylamide tertialy-butyl sulfonic (ATBS) and acrylamide co-polymer.

* * * * *